(12) United States Patent
Ganesh et al.

(10) Patent No.: US 9,363,710 B1
(45) Date of Patent: Jun. 7, 2016

(54) SYSTEMS AND METHODS FOR MANAGING IN-VEHICLE SYSTEM NETWORK CONNECTIVITY

(71) Applicant: QUALCOMM Incorporated, San Diego, CA (US)

(72) Inventors: Shriram Ganesh, San Diego, CA (US); Naveen Kalla, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/546,280

(22) Filed: Nov. 18, 2014

(51) Int. Cl.
*H04B 7/00* (2006.01)
*H04W 28/24* (2009.01)
*H04W 28/20* (2009.01)
*H04L 29/08* (2006.01)
*H04W 28/22* (2009.01)
*H04W 4/00* (2009.01)
*H04W 76/02* (2009.01)

(52) U.S. Cl.
CPC .............. *H04W 28/24* (2013.01); *H04L 67/12* (2013.01); *H04W 4/008* (2013.01); *H04W 28/20* (2013.01); *H04W 28/22* (2013.01); *H04W 76/023* (2013.01)

(58) Field of Classification Search
CPC ......... H04L 67/12; H04L 63/08; H04L 67/10; H04L 43/08; H04L 67/22; H04L 2209/80; H04L 51/14; H04L 51/38; H04L 65/4084; H04L 65/60; H04L 65/602; H04L 65/80; H04L 67/2842; H04L 67/325; H04L 69/00; H04L 9/08; H04L 9/30; H04L 9/03

USPC ........................................................ 455/41.2
See application file for complete search history.

(56) References Cited

U.S. PATENT DOCUMENTS

| | | | |
|---|---|---|---|
| 8,086,267 B2 | 12/2011 | Santori, Jr. et al. | |
| 8,238,872 B2 | 8/2012 | Wisnewski et al. | |
| 8,781,442 B1* | 7/2014 | Link, II ................. | G08G 1/205 370/338 |
| 2007/0140187 A1 | 6/2007 | Rokusek et al. | |
| 2012/0039248 A1 | 2/2012 | Schneider et al. | |
| 2014/0164582 A1 | 6/2014 | Dawson et al. | |
| 2014/0207950 A1* | 7/2014 | Badiee .................... | H04L 43/08 709/224 |
| 2015/0061895 A1* | 3/2015 | Ricci ....................... | H04W 4/22 340/902 |

* cited by examiner

*Primary Examiner* — Ajibola Akinyemi
(74) *Attorney, Agent, or Firm* — The Marbury Law Group, PLLC

(57) ABSTRACT

Systems and methods for managing in-vehicle system network connectivity. A media system processor may determine an application requirement of an application running on the media system and an available bandwidth of a cellular communication link of the media system. The processor may receive available cellular communication link bandwidths of one or more mobile devices in communication with the media system. The processor may rank an ability of the media system, the first one or more mobile devices to meet the application requirement based on their respective available bandwidths, select the highest ranked of the media system, and the one or more mobile devices via a short-range communication to receive content for presentation by the media system, and may receive the content for the selected highest ranked of the media system, and the one or more mobile devices.

38 Claims, 8 Drawing Sheets

SYSTEMS AND METHODS FOR MANAGING IN-VEHICLE SYSTEM NETWORK CONNECTIVITY

BACKGROUND

Vehicle entertainment systems have evolved into multi-function systems, and may include hardware and software enabling the system to establish wireless communication with an information network, for example, using a cellular communication protocol, such as GSM, CDMA, and LTE. Such systems may also be capable of establishing wireless communications with a mobile device inside the vehicle using a short range communication protocol, such as Bluetooth®. When in communication with a mobile device, the vehicle system may also use the mobile device's cellular network connection to communicate with the cellular network. The vehicle system may thus have a variety of available network connections that it may use to communicate with a network, for example, to receive content for presentation in the vehicle.

SUMMARY

Various embodiments include a method for managing in-vehicle system network connectivity implemented in a processor of a first wireless device (e.g., a vehicle media system), which may include determining an application requirement of a media application running on the first wireless device in communication with a first communication network over a first communication link, determining a first available bandwidth of the first communication link, receiving via a first short-range communication link from a second wireless device a second available bandwidth of a second communication link to a second network supported by the second wireless device, receiving via a second short-range communication link from a third wireless device a third available bandwidth of a third communication link, ranking an ability of each of the first, second, and the third wireless devices to meet the application requirement based on the first, second, and third available bandwidths, selecting a highest ranked of the first wireless device, the second wireless device, and the third wireless device to receive content for presentation by the first wireless device over the respective first, second, or third communication link, and receiving the content from the selected highest ranked of the first, second, and the third wireless devices. In some embodiments, the application requirement may be a quality of service (QoS) requirement, which may include one or more of a minimum required data rate, a maximum permitted data delay, a minimum required throughput, a maximum permitted error rate, and a maximum permitted data loss rate.

In some embodiments, the method may further include determining a radio access technology capability of each of the second and third wireless devices, and ranking the ability of the first, second, and the third wireless devices to meet the application requirement further based on the radio access technology capability of each of the second and third wireless devices.

In some embodiments, the method may further include determining one or more carrier networks available to each of the first, second, and third wireless devices, and ranking the ability of first, second, and third wireless devices to meet the application requirement further based on the carrier networks available to each of the first, second, and third wireless devices.

In some embodiments, the method may further include determining a battery level of each of the second and third wireless devices, and ranking the ability of the first, second, and third wireless devices to meet the application requirement further based on the battery level of each of the second and third wireless devices.

In some embodiments, the method may further include determining a received signal level of the first, second and third communication links, and ranking the ability of the first, second, and third wireless devices to meet the application requirement further based on the received signal level of the first, second and third communication links.

In some embodiments, the method may further include determining a connection reliability of each of the first, second and third communication links, and ranking the ability of the first, second, and third wireless devices to meet the application requirement further based on the connection reliability of each of the first, second and third communication links.

In some embodiments, the method may further include determining an application requirement of an application running on each of the second and third wireless devices, and ranking the ability of the first, second, and third wireless devices to meet the application requirement further based on the application requirement of the application running on each of the second and third wireless devices.

In some embodiments, the method may further include determining an anticipated disruption in one of more of the first communication link, the second communication link, and the third communication link, and ranking the ability of the first, second, and third wireless devices to meet the application requirement further based on any anticipated disruptions in the one of more of the first, second, and third communication links.

In some embodiments, the method may further include ranking the ability of the second and third wireless devices to meet the application requirement further based on an amount of time that the second and third wireless devices have established communication links with the first wireless device in the past.

In some embodiments, the method may further include re-ranking the ability of the first, second, and third wireless devices to meet the application requirement based on a change in one or more of the first, second, and third available bandwidths, and selecting the highest re-ranked of the first, second, and third wireless devices to receive the content for presentation by the first wireless device over the respective first, second, or third communication links.

Further embodiments include a media system including a wide-area network transceiver configured to communicate with a first communication network over a first communication link, a short-range transceiver configured to communicate via short-range communication links with other wireless devices, and a processor configured to perform operations of the embodiment methods described above. Further embodiments include a media system having means for performing functions of the embodiment methods described above. Further embodiments include non-transitory processor-readable storage media having stored thereon processor-executable instruction configured to cause a processor of a media system to perform operations of the embodiment methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
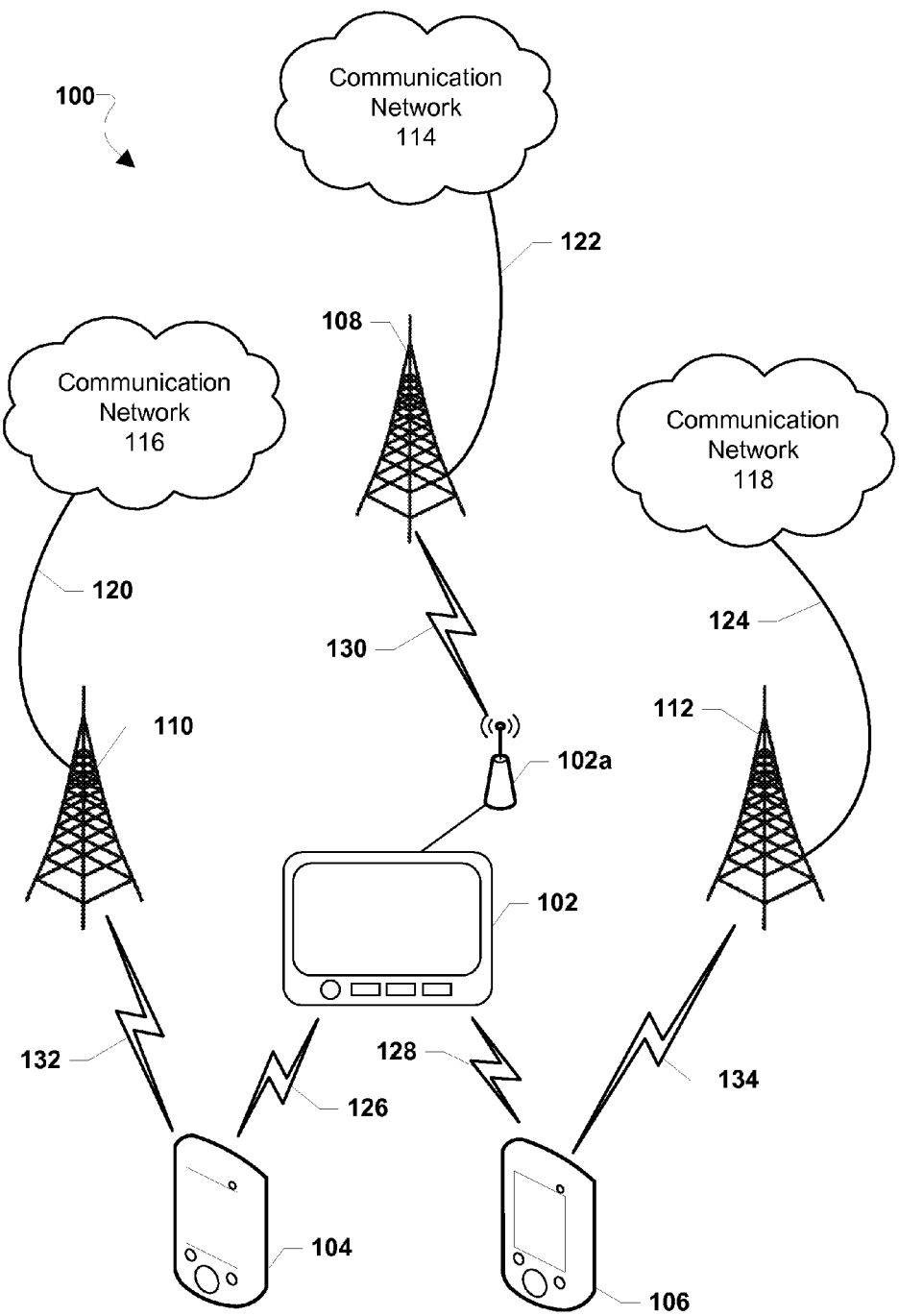
FIG. 1 is a block diagram of an embodiment communication system suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The various embodiments provide methods, and wireless devices configured to implement the methods, that enable management of a network connectivity for a media system, such as an in-vehicle media system, an infotainment system, or other similar media system. A processor of the media system may generate a dynamic priority list for selecting from among the media system and a plurality of mobile devices to use a respective cellular network connection of the media system or of one of the mobile devices. Each participating mobile device may establish communications with the media system and provide information to the media system about the mobile device's capabilities, application(s) running on the mobile device, available network connectivity, battery level, and other similar information. A processor of the media system may use the information to generate a priority list including the participating mobile devices and the media system, which itself may be capable of cellular network communication, and one of the plurality of mobile devices or the media system may be selected to share its cellular network connection to receive content for presentation by the media system. Thus, the system and method may dynamically determine the "best" mobile device to share its network connection with the other devices within the vehicle or for receiving a media stream to be played on the vehicle's media system.

The terms "mobile device," "wireless device," and "wireless communication device" are used interchangeably herein to refer generally to any one or all of cellular telephones, smartphones, web-pads, tablet computers, Internet enabled cellular telephones, Wi-Fi enabled electronic devices, personal data assistants (PDAs), laptop computers, personal computers, wireless accessory devices, wireless peripheral devices, and similar electronic devices equipped with a short-range radio (e.g., a Bluetooth® radio, a Peanut® radio, a Wi-Fi radio, etc.) and/or a wide area network connection (e.g., an LTE, 3G or 4G wireless wide area network transceiver or a wired connection to the Internet). The term "wireless device" is also used to refer to a media system having short-range and wide area network capabilities in the claims and the various embodiments. Thus, reference to a particular type of computing device as being a mobile device or a wireless device is not intended to limit the scope of the claims unless a particular type of mobile device or wireless device is specifically recited.

As used in this application, the terms "component," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device itself may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

An in-vehicle media system, such as an in-vehicle entertainment system, an infotainment system, or another similar media system (a "media system") may include components that may be configured to provide audio and/or video output in a vehicle. The media system may also be configured to establish a wireless network communication link to receive one or more services from the network, such as receiving content for presentation by the media system. The media system may also establish a short-range communication link with one or more mobile devices in the vehicle, and the media system may use a network connection (e.g., a cellular network connection) of one of the mobile devices to receive services such as content.

The connection between the vehicle system and a mobile device may require manual configuration by a user. In the event that multiple mobile devices are present in the vehicle, each mobile device may have a network connection (or connections) that vary in relative quality and available bandwidth. While it may be desirable to select the mobile device having the best network connection for network communications, the "best" mobile device must be determined manually, and the connection between the vehicle system and the "best" mobile device must be established by a user. Further, the vehicle system is typically capable of managing a communication session with a single mobile device, and so the vehicle system may only have access to one mobile device network connection at a time.

In the various embodiments, a processor of the media system may be configured to evaluate the network connections available to it, including its own network connections as well as network connections available through one or more mobile devices, and to select one of the available network connections based on a dynamically generated priority list.

The dynamic priority list may be generated by the processor based on a number of criteria. The media system may determine an application requirement of an application running on the media system. The application requirement may include one or more of a minimum data rate, a minimum throughput, a maximum delay rate, a maximum data error rate, and other similar criteria. The application requirement may consider these factors for the downlink and/or the uplink. An available bandwidth of each of the communication links available to the media system may also be determined. The processor may also determine for each mobile device their radio access technology (RAT) capabilities, the available carrier networks that may be accessed by each mobile device, and a battery level of each mobile device. The processor may further determine a received signal level for each communication link (i.e., including the communication link of the media system and the mobile devices), as well as a reliability of each of the available communication links. Further, the processor may determine an application requirement of an application running on each mobile device, which may compete for available bandwidth with the application running on the media system. The processor may also determine an anticipated disruption in connectivity or service of each of the available communication links, for example, using information from each communication network and/or based on knowledge of the vehicle's route and network availability and congestion along the route.

FIG. 1 illustrates a system 100 suitable for use with the various embodiments. The system 100 may include a media system 102, a first mobile device 104, and a second mobile device 106. For ease of reference only two mobile devices 104, 106 are illustrated in FIG. 1 and referred to in the descriptions of the various embodiments and the claims. However, references to first and second mobile devices are not intended to limit the embodiments or the scope of the claims to just two mobile devices, because the embodiments and the claims are equally applicable to any number of mobile devices communicating with a media system 102. Also for ease of reference in the claims, the media system 102 may be referred to as a first wireless device executing a media application, the first mobile device 104 may be referred to as a second wireless device, and the second mobile device 106 may be referred to as a third wireless device. Thus, use of the terms "first," "second," and "third" herein are merely for ease of reference and clarity and not intended to define a particular order, correlate to a particular embodiment or device, or otherwise limit the scope of the claims.

The media system 102 may include components that may be configured to provide audio and/or video output such as audiovisual entertainment in the vehicle. The media system 102 may also include a wireless wide-area network transceiver 102a that may be configured to enable the media system to communicate with a first communication network 114 via a base station 108. The media system 102 may communicate with the base station 108 over communication link 130, and the base station 108 may communicate with the first communication network 114 over a wired and/or wireless communication link 122. The media system may use its network connection for a variety of communication services, including receiving content from a communication network for rendering and presentation in the vehicle.

The media system 102 and the first and second mobile devices 104 and 106 may include short-range wireless transceivers, and the first and second mobile devices 104 and 106 may be configured to communicate with the media system 102 over short-range communication links 126 and 128, respectively. The short-range communication links may use a short-range communication protocol, such as Bluetooth®, Zigbee®, Wi-Fi, IrDA, or another short-range communication protocol. The first mobile device 104 may communicate with a second communication network 116 via a base station 110, and the second mobile device 106 may communicate with a third communication network 118 via a base station 112. The first mobile device 104 may communicate with the base station 110 over one communication link 132, and the base station 110 may communicate with the second communication network 114 over a wired and/or wireless communication link 120. The second mobile device 106 may communicate with the base station 112 over another communication link 134, and the base station 112 may communicate with the third communication network 118 over a wired and/or wireless communication link 124. Each of the base stations 108, 110, and 112 may include a network node capable of providing wireless communications to the media system 102 and the mobile devices 104 and 106, and may include a base transceiver station, a radio base station, an eNodeB device, or an enhanced eNodeB device. The communication links 120, 122, and 124 may include wired or wireless communication links such as fiber optic backhaul links, microwave backhaul links, and other similar communication links.

The communication links 130, 132, and 134 may include cellular connections that may be made through two-way wireless communication links using a wireless radio access technology (RAT) such as 3GPP Long Term Evolution (LTE), Worldwide Interoperability for Microwave Access (WiMAX), Code Division Multiple Access (CDMA), Time Division Multiple Access (TDMA), Wideband CDMA, Global System for Mobility (GSM), and other mobile telephony communication technologies. A communication link may include one or more frequency bands, and a frequency band may include one or more logical channels. While the communication links 130, 132, and 134 are illustrated as single links, in some embodiments the media system 102, the first mobile device 104, and the second mobile device 106 may communicate with their respective base stations using two or more RATs over two or more frequency bands.

Each of the communication networks 114, 116, and 118 may be operated by a network operator, and each of the communication networks may separately authenticate each of the media system 102, the first mobile device 104, and the second mobile device 106 for access to communication services via the base stations 108, 110, and 112. While each communication network is illustrated as communicating with a different base station, in some embodiments network operators may share access to base station(s). Similarly, while each of the media system 102, the first mobile device 104, and the second mobile device 106 are illustrated as communicating with a different base station for clarity, in some embodiments each of the media system 102, the first mobile device 104, and the second mobile device 106 may communicate with a single base station, each using one or more RATs and/or frequency bands, and further may communicate with different communication networks using the same base station.

Figure 2:
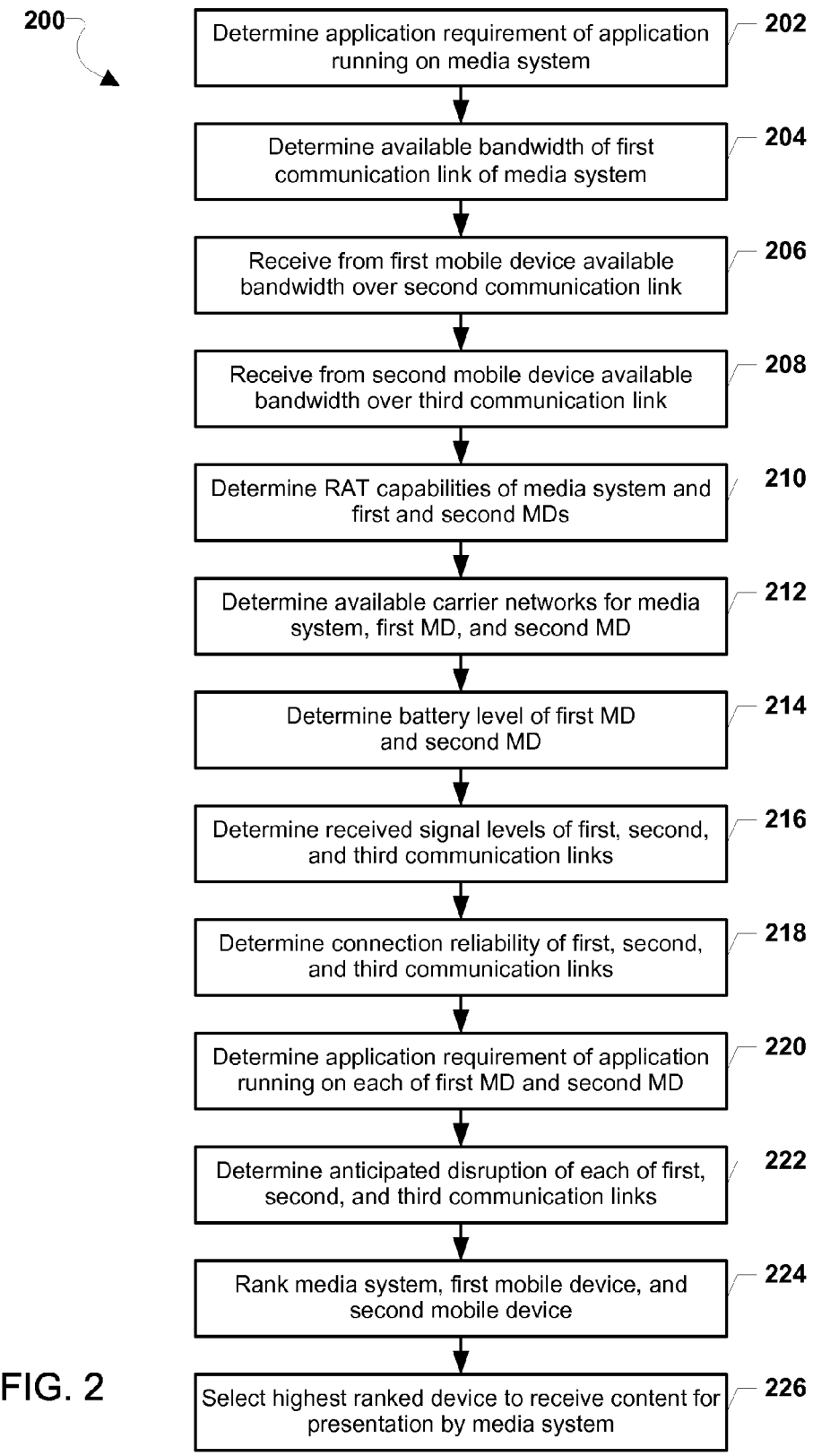
FIG. 2 is a process flow diagram illustrating an embodiment method for managing in-vehicle system network connectivity.

FIG. 2 illustrates an embodiment method 200 for managing in-vehicle system network connectivity. A processor of a media system (e.g., the media system 102) may be configured to evaluate available network connections, (e.g., network connections 130, 132, and 134) and to select one of the available network connections to receive content for the media system based on a dynamically generated priority list.

In block 202, a processor of the media system may determine an application requirement of an application running on the media system. The application requirement may include a quality of service (QoS) requirement. The QoS requirement may include one or more of a minimum required data rate, a maximum permitted data delay, a minimum required throughput, a maximum permitted error rate, and a maximum permitted data loss rate. The processor may consider an application requirement for either a downlink portion of a communication link, an uplink portion of a communication link, or both the downlink and uplink portions of the communication link.

In block 204, the processor may determine an available bandwidth of a first communication link (e.g., the communication link 130 of the media system 102) with a communication network. Additionally or alternatively, the processor may determine an end-to-end bandwidth available between the media system and a content server (e.g., a TCP/IP content server).

In block 206, the media system may receive from a first mobile device (e.g., the mobile device 104) a bandwidth that is available over a second communication link (e.g., the communication link 132). In block 208, the media system may receive from a second mobile device (e.g., the mobile device 106) a bandwidth that is available over a third communication link (e.g., the communication link 134). The bandwidth may include a carrying capacity of a frequency band, which may be determined based on one or more of a congestion level, an amount of data carried over the frequency band, a requested amount of data to be carried over the frequency band (as may be determined from a buffer status report or similar request for wireless communication link resources), an amount of data buffered for transmission over the frequency band, a data rate, a data throughput, a data delay, a data loss rate, a rate of retransmission requests, a level of signal interference, and the like, including combinations thereof. The available bandwidth of the first, second, and third communication links may affect their highest re-ranked ability to meet the application requirement of the application running on the media system.

In block 210, the processor may determine for the media system and each mobile device their radio access technology (RAT) capabilities. For example, each of the media system 102 and the mobile devices 104 and 106 may include hardware and software configured to enable communications using one or more RATs, such as LTE, WiMAX, GSM, and other RATs. Each RAT may support different data rates, data throughputs, and other data communication characteristics, which may affect the ability of each mobile device to meet the application requirement of the application running on the media system.

In block 212, the processor may determine available carrier networks that may be accessed by each of the media system and the first and second mobile devices. For example, each device may be configured, using hardware, software, and a subscriber account, to access a carrier network operated by one or more network operators. The availability of different carrier networks may affect the availability of data to meet the application requirement of the application running on the media system.

In block 214, the processor may determine an available amount of stored power, such as a battery level, of each of the first and second mobile devices. A length of time that a mobile device may be able to continue operations to support network communications may affect the ability of that mobile device to meet the application requirements of the application running on the media system.

In block 216, the processor may determine a received signal level for each available communication link, including the communication link of the media system (e.g., the communication link 130) as well as those of the mobile devices (e.g., the communication links 132 and 134). The received signal level may be based on a pilot signal or traffic signal from a base station (e.g., the base stations 108, 110, and 112), and may include an indication of signal strength or of signal quality, such as a reference signal receive power (RSRP), a received signal strength indication (RSSI), a signal-to-noise ratio (SNR), a carrier to noise ratio (CNR) value, a signal noise and distortion (SINAD), a signal to interference (SII), a signal to noise plus interference (SNIR), a signal to quantization noise ratio (SQNR), a reference signal receive quality (RSRQ), a channel quality indicator (CQI), or another measurement of signal strength or signal quality. The received signal levels may provide another indication of the ability of each communication link to meet the application requirements of the application running on the media system.

In block 218, the processor may determine the reliability of each of the available communication links. The communication link reliability may provide another indication of the ability of each communication link to meet the application requirement of the application running on the media system. The communication link reliability may include historical reliability information, such as an amount of time and/or a number of times that each of the media system and the mobile devices 104 and 106 have provided its communication link to receive content for the media system.

In block 220, the processor may determine an application requirement of an application running on each of the first and second mobile devices. An application running on a mobile device, such as a video streaming application, VoIP application, or network gaming application, may compete for available bandwidth with an application running on the media system. The application requirement of an application running on a mobile device may provide another indication of the ability of the first and second mobile devices to meet the application requirement of the application running on the media system.

In block 222, the processor may determine whether there is an anticipated disruption in connectivity or service of each of the available communication links, for example, using information from each communication network and/or based on knowledge of the vehicle's route and network availability and congestion along the route. The anticipated disruptions in connectivity or service of each of the available communication links may provide another indication of the ability of each communication link to meet the application requirement of the application running on the media system.

To anticipate disruptions in connectivity or service in block 222, the processor may receive location and route information from the media system if it is configured with a GPS or other navigation system, and/or from a mobile device. Further, the media system may be provided with the route of the vehicle, as well as known and/or anticipated network connectivity and/or data rates along the route. The processor may use information regarding the availability of base stations along the anticipated route, the radio access technology (RAT) availability of those base stations (e.g., whether the base stations support 2G, 3G, and/or 4G RATs), and information about the radio frequency (RF) environment along the route. The processor may also consider the carrier networks that may be available along the route when anticipating network connectivity. Such information may be stored in memory of the media system (e.g., pre-provisioned information), in memory of any of the mobile devices, or received from one or more networks via a wired communication link.

The processor may also anticipate a disruption in connectivity or service of each of the available communication links using information about network conditions in each communication network and/or each communication network backhaul, including network congestion, end-to-end data delays, and other network information. Such information may be received from one or more networks via a wired communication link.

In block 224, the processor of the media system may use the obtained information to rank the media system, the first mobile device, and the second mobile device to generate a dynamic priority list of the devices. In some embodiments, the dynamic priority list may be generated using an algorithm to determine a priority value for each mobile device. In some embodiments, a weighting value may be applied to one or more of the criteria. An example of an algorithm to rank the media system and mobile devices is provided in Eq. 1:

$$\text{Device Priority} = (w1 * \text{available bandwidth}) + (w2 * \text{RAT capability}) + (w3 * \text{available carrier networks}) + (w4 * \text{battery level}) + (w5 * \text{signal levels}) + (w6 * \text{connection reliability}) + (w7 * \text{application requirement of mobile device application}) + (w8 * \text{anticipated communication link disruption}) \quad \text{Eq. 1}$$

where w1-w8 include weights that may be applied to each value. The algorithm may include some or all of the criteria discussed above. The weights w1-w8 may be determined based on usage of each device, selection of each device, and/or based on past performance of an application over a communication link. The weights may also be based on user input or user selection. For example, a user may confirm or reject a selection of a mobile device by the media system, and the user's confirmation or rejection may be used by the processor of the media system to increase or decrease the value of one or more weights.

In some embodiments, the processor of the media system may increase or decrease a weight used for ranking the media system and mobile devices based on a length of time that a mobile device has provided its communication link to receive content for the media system. For example, the communication link reliability may include historical reliability information, such as an amount of time and/or a number of times that each the mobile devices 104 and 106 have provided its communication link to receive content for the media system. The processor of the media system may track the length of time that each mobile device shares its communication link with the media system (e.g., with a device identifier), and the processor of the media system may assign a higher priority (i.e., increase a weight assigned to the communication link reliability) for mobile devices with which the media system has been associated (i.e., leveraged the mobile device cellular communication link) for longer periods of time. For example, by basing priorities assigned to devices based on the length of time or frequency that the share a communication link with the media system, the mobile device(s) of an owner or regular driver and passengers of a vehicle whose devices share their communication links with the media device may be assigned a higher weight or priority than a weight or priority assigned to a non-regular passenger or carpooling guest. To enable this, the processor of the media system may track the length of time that it is leveraging each mobile device, and the processor of the media system may assign a higher priority to devices it "knows" and/or with which the media system has been associated longer. In some embodiments, processor of the media system may balance or offset the length of time that each mobile device shares its communication link with the media system against other parameters. For example, a recently-associating mobile device with better available bandwidth, RAT capabilities, available networks, longer battery life, faster processor, or other characteristics may be assigned a relatively higher priority or rank based on its superior capabilities, despite its associated communication link reliability being relatively lower than other mobile devices that have been communicating with the media system longer.

In some embodiments, the processor of the media system may increase or decrease a weight used for ranking the media system and mobile devices based on a user input or a user selection. For example, the processor of the media system may present the dynamically generated priority list (e.g., on a display, audibly through a speaker, or another form of presentation). The processor of the media system may also receive an input from a user approving or vetoing the ranking of one or more devices on the generated priority list. The processor of the media system may track the approvals or vetoes together with the context in which a ranking of a device is approved or vetoed. For example, a user may prefer one to use one device's network connection over another device's network connection to provide content for the media system. The processor of the media system may adjust a weight (which may include adding a criteria, such as a "user preference", and/or adjusting a weighting value of the "user preference" to the calculation of device priority described above) based on the user's approval or veto. As another example, the user's approval or veto may be associated with an application running on the media system. For example, the processor of the media system may track a user's preference of a first wireless device for a first application (e.g., a streaming video service such as Netflix®). The user's preference may include approving the first wireless device or vetoing a second wireless device to receive content for the first application. The processor of the media system may also track a user's preference of the second wireless device for a second application (e.g., a streaming audio service, such as Spotify®). Again, the user's preference may include approving the second wireless device, or vetoing the first wireless device, to receive content for the second application. The processor of the media system may track such user inputs, and may adjust a device priority based on the inputs, a history of the user's inputs, and the context in which the inputs are received. In addition or as an alternative to the application running on the media system, the processor of the media system may associate a user's selection with one or more other criteria, including available bandwidth, RAT capability, available carrier networks, battery level, signal levels, connection reliability, application requirements of a mobile device application, and/or anticipated communication link disruption. Thus, the processor of the media system may track a user's inputs (i.e., preferences), and the processor may adjust one or more criteria weights according to the tracked user preferences.

In block 226, the processor of the media system may select the highest ranked of the media system, the first wireless device, and the second wireless device to receive content for presentation by the media system over the respective first, second, or third communication link. Thereafter, the selected device may receive the content for the application running on the media system, and the media system may receive the content from the receiving device.

Figure 3:
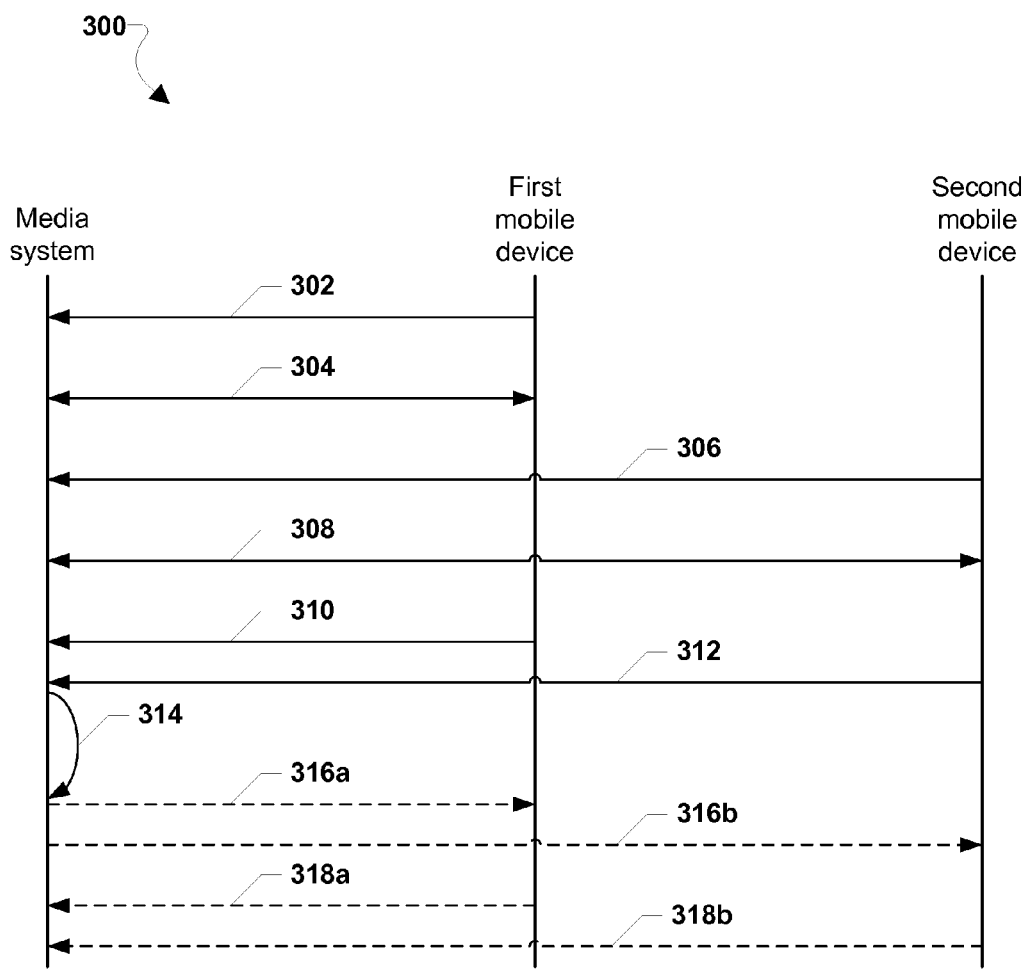
FIG. 3 is a call flow diagram illustrating an embodiment method for managing in-vehicle system network connectivity.

FIG. 3 is a call flow diagram illustrating an embodiment method 300 for managing in-vehicle system network connectivity. The first mobile device may send a request to the media system to establish a short-range communication link, and may provide information related to the establishment of a short-range communication session 302. Using the provided information, the media system and the first mobile device may establish a short-range communication link 304. Similarly, the second mobile device may send a request to the media system to establish a short-range communication link and/or may provide information related to the establishment of the short-range communication session 306. Using the provided information, the media system and the second mobile device may establish a short-range communication link 308. In some embodiments, each mobile device may require connectivity software to communicate with the media system. An example of a platform that enables multiple mobile devices to communicate with a media system is the Qualcomm® AllJoyn™ service framework. The connection framework may enable the media system to query participating mobile devices for information, and may further enable coordination of the handover of a communication session to any available mobile device.

The first and second mobile devices may provide information to the media system to enable the media system to evaluate each mobile device and its network communication link 310, 312. The information provided may include an available bandwidth, RAT capabilities, available carrier networks, battery level, received signal levels, connection reliability, application requirement of mobile device application, and/or anticipated communication link disruptions. The media system may already have some of this information from previous communications with a mobile device, or the media system may receive some of this information from its own wide area wireless communication network.

The media system may rank the media system, the first mobile device, and the second mobile device to generate a dynamic priority list of the devices in operation 314. In some embodiments, the dynamic priority list may be generated using an algorithm to determine a priority value for each mobile device as discussed above. In some embodiments, a weighting value may be applied to one or more of the criteria.

The media system may select the highest ranked of the media system, the first wireless device, and the second wireless device to receive content for presentation by the media system over the respective first, second, or third communication link. When the media system selects the first mobile device, the media system may send a selection message to the first mobile device 316a. When the media system selects the second mobile device, the media system may send a selection message to the second mobile device 316b. The media selection message may include a resource locator or other information to enable the mobile device to obtain content for the application running on the media system. Using the information in the media selection message, the first mobile device 318a) or the second mobile device 318b) may receive the content for the media system application and may provide the received content to the media system over the respective short-range communication link with the media system.

Figure 4:
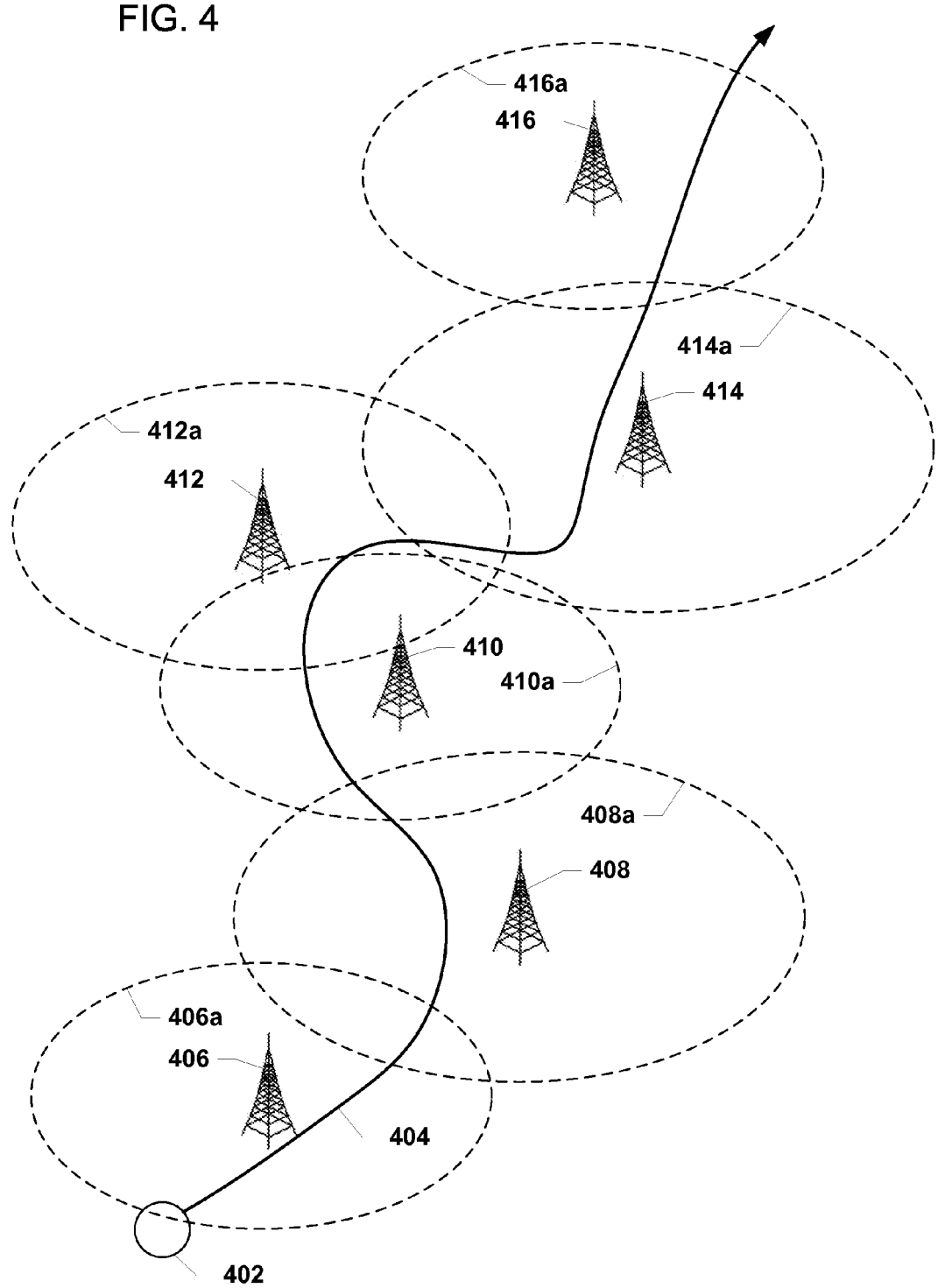
FIG. 4 is a route diagram illustrating base station coverage areas along a route.

FIG. 4 illustrates a vehicle 402 traveling a route 404 that passes through a series of cell zones or base station coverage areas 406a-416a supported by a number of base stations 406-416. The coverage area 406a-416a of each base station 406-416 may vary in size and coverage based on a transmit power, a RAT used by a base station, a frequency band used by each base station, RF interference or conditions, local terrain and buildings, and other factors. Each base station may provide access to one or more carrier networks, which may vary for each base station. Thus, as the vehicle 402 moves along the route 404, the ability of the media system and each mobile device to receive data to meet the application requirement of the application running on the media system may vary, due to variations in available bandwidth, RATs supported by each base station, available carrier networks at each base station, signal levels received by each device from each base station (which may vary based on frequency bands available at or supported by each base station), and any disruptions in wireless communications or in any network accessible through each base station.

As network, backhaul, and/or RF conditions vary along the route, the processor of the media system may dynamically redetermine the priority list of the media system and the first and second mobile devices. Further, application requirements of the application running on the media system and/or on each mobile device may also change. Such changes in network conditions and application requirements may be used by the processor of the media system to redetermine update the priority list dynamically as the vehicle 402 moves along the route 404.

Figure 5:
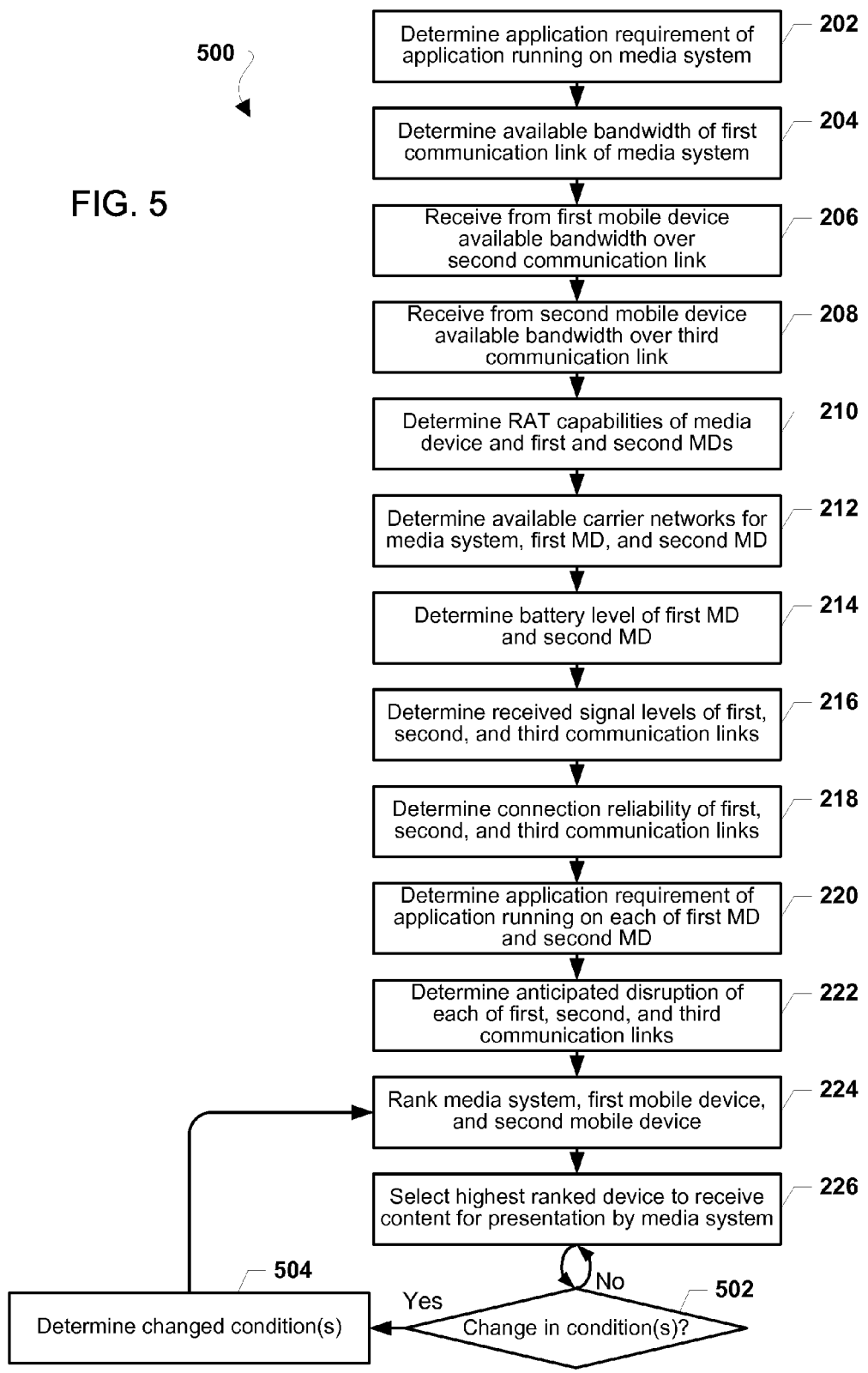
FIG. 5 is a process flow diagram illustrating another embodiment method for managing in-vehicle system network connectivity.

FIG. 5 illustrates another embodiment method 500 for managing in-vehicle system network connectivity. The method 500 is similar to the method 200 described above with reference to FIG. 2 for like numbered blocks, but includes operations in determination block 502 and block 504 for updating the priority list dynamically. Specifically, in determination block 502, the processor of the media system may periodically determine whether one or more conditions have changed, such as after a highest ranked device is selected to receive content for the media system in block 226. When no conditions have changed (i.e., determination block 502="No") the processor may pause for a predetermined amount of time or monitor for a change in conditions (e.g., a cell handover by the device receiving the content for the media system) before repeating the operation of determining whether one or more conditions have changed in determination block 502.

In response to determining that one or more conditions have changed (i.e., determination block 502="Yes"), the processor may determine the changed condition(s) and determine a new value associated with the changed condition(s) in block 504. Using the changed condition(s), as well as any unchanged conditions, the processor may redetermine the priority list of the media system and the first and second mobile devices in block 224. In some embodiments, the processor may determine that there has been a change of conditions when a mobile device begins communicating with the media system (e.g., joins the LAN and/or establishes a communication link with the media system), or ceases to communicate with the media system (e.g., leaves the LAN, moves out of range of the media system, or fails to communicate with the media system for a threshold period of time). When a new mobile device begins communicating with the media system, processor of the media system may determine the capabilities, available bandwidth(s) and carrier network(s), and other parameters of a new mobile device before redetermining the priority list of the media system and the mobile devices in block 504.

Based on the redetermined priority list, in block 226, the processor of the media system may select the highest ranked of the media system, the first wireless device, and the second wireless device to receive content for presentation by the media system over the respective first, second, or third communication link, and the selected device may receive the content for the application running on the media system in response to the selecting and provide the content to the media system.

When the processor selects a new device to receive the content for the application, session continuity may be maintained by the processor to avoid disruption of content reception. The media system may maintain session continuity using, for example, multi-part TCP routing, or by maintaining a session key that the media system may provide to each newly-selected device in block 226. When a new device is selected to receive content, an ongoing delivery session may thereby be maintained across devices and communication networks.

Figure 6:
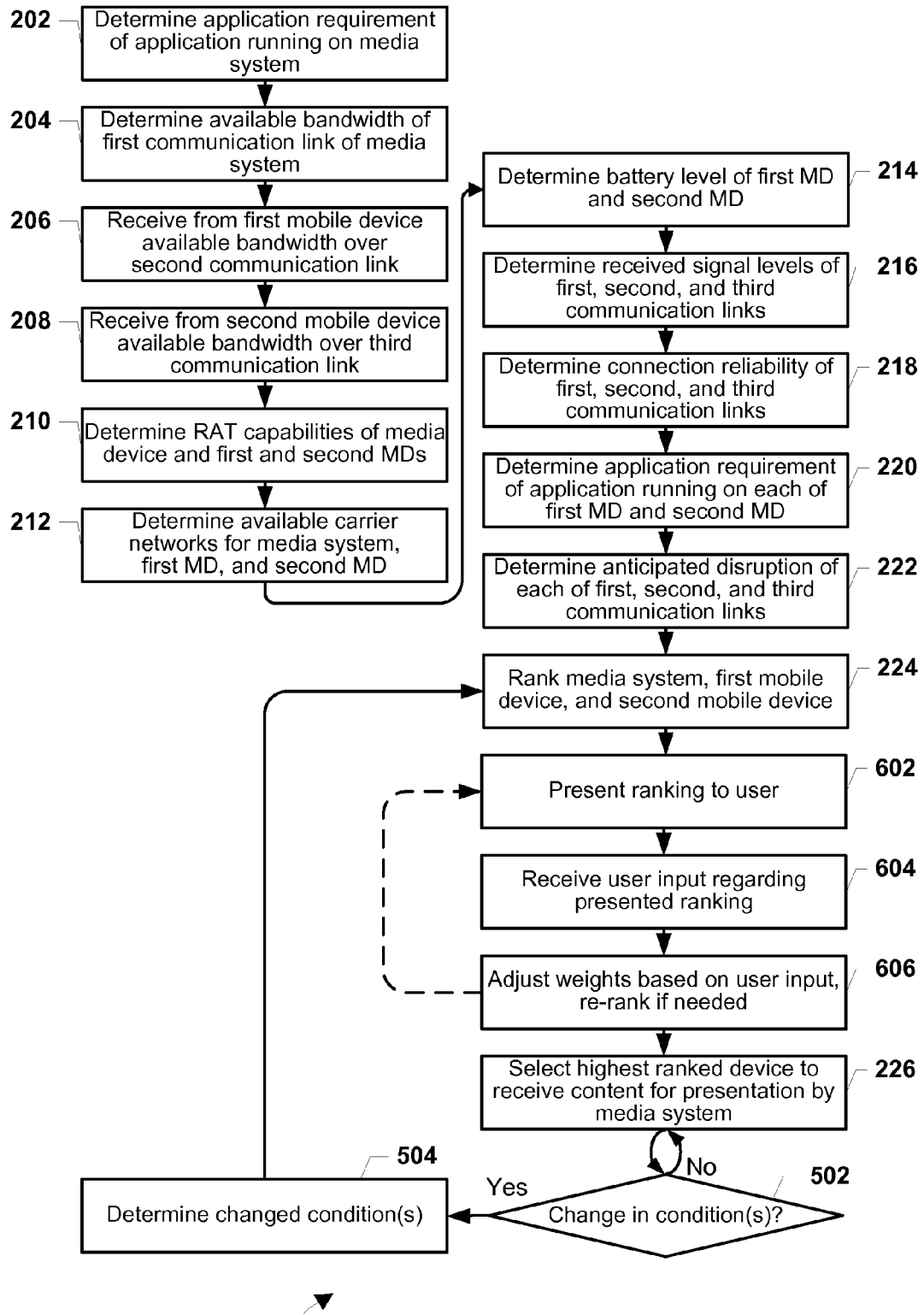
FIG. 6 is a process flow diagram illustrating another embodiment method for managing in-vehicle system network connectivity.

FIG. 6 illustrates another embodiment method 600 for managing in-vehicle system network connectivity. The method 600 is similar to the methods 200 and 500 described above with reference to FIGS. 2 and 5 for like numbered blocks, but includes operations in determination block 602, 604, and 606 for applying a user input to the dynamic priority list. Specifically, in block 602, the media system may present a ranking of the media system, the first mobile device, and the second mobile device to a user, for example, a driver or a passenger in a vehicle. In block 604, the media system may receive one or more inputs from a user regarding the ranking. In block 606, based on the user input(s), the processor of the media system may adjust one or more weights applied to the criteria used to generate the dynamic priority list. The processor of the media system may generate a new priority list based on the adjusted weights (i.e., re-rank the priority list). Optionally, the updated priority list may be presented to the user in block 602, and additional user input(s) may be received by the media system in block 604.

In an embodiment, the processor of the media system may increase or decrease a weight used for ranking the media system and/or a mobile device based on the received user input or user selection in block 606. For example, the processor of the media system may present the dynamically generated priority list (e.g., on a display, audibly through a speaker, or another form of presentation), and the processor of the media system may also receive an input from a user approving or vetoing the ranking of one or more devices on the generated priority list. As one example, a user may prefer to use a first mobile device to provide its cellular network connection for receiving content for the media system. If the first mobile device is ranked higher than other mobile devices, the user may provide an input to the media system approving its ranking, which may increase a weight applied to the first mobile device. As another example, the user may provide an input to the media system vetoing the ranking of a less preferred second mobile device, which may decrease a weight applied to the second mobile device. The processor of the media system may track the approvals or vetoes together with the context in which a ranking of a device is approved or vetoed. The processor of the media system may adjust a weight (which may include adding a criteria, such as a "user preference", and/or adjusting a weighting value of the "user preference" to the calculation of device priority described above) in block 606 based on the user's approval(s) or veto(s).

The user's approval or veto may be associated with an application running on the media system. For example, the processor of the media system may track a user's preference of a first wireless device for a first application (e.g., a streaming video service). The user's preference may include approving the first wireless device or vetoing a second wireless device to receive content for the first application. The processor of the media system may also track a user's preference of the second wireless device for a second application (e.g., a streaming audio service). Again, the user's preference may include approving the second wireless device, or vetoing the first wireless device, to receive content for the second application. In addition or as an alternative to the application running on the media system, the processor of the media system may associate a user's selection with one or more other criteria, including available bandwidth, RAT capability, available carrier networks, battery level, signal levels, connection reliability, application requirements of a mobile device application, and/or anticipated communication link disruption. Thus, the processor of the media system may track a user's inputs (i.e., preferences) received in block 604, and the processor may adjust one or more criteria weights in block 505 according to the tracked user preferences.

Based on the priority list, in block 226, the processor of the media system may select the highest ranked device to receive content for presentation by the media system over the respective first, second, or third communication link, and the selected device may receive the content for the application running on the media system in response to the selecting and provide the content to the media system.

The processor of the media system may track historical user inputs, and may adjust a device priority based on the inputs, a history of the user's inputs, and the context in which the inputs are received. In an embodiment, when the user has provided inputs in the past, those past user inputs may be applied by the processor of the media system when generating the dynamic priority list of devices in block 224.

Figure 7:
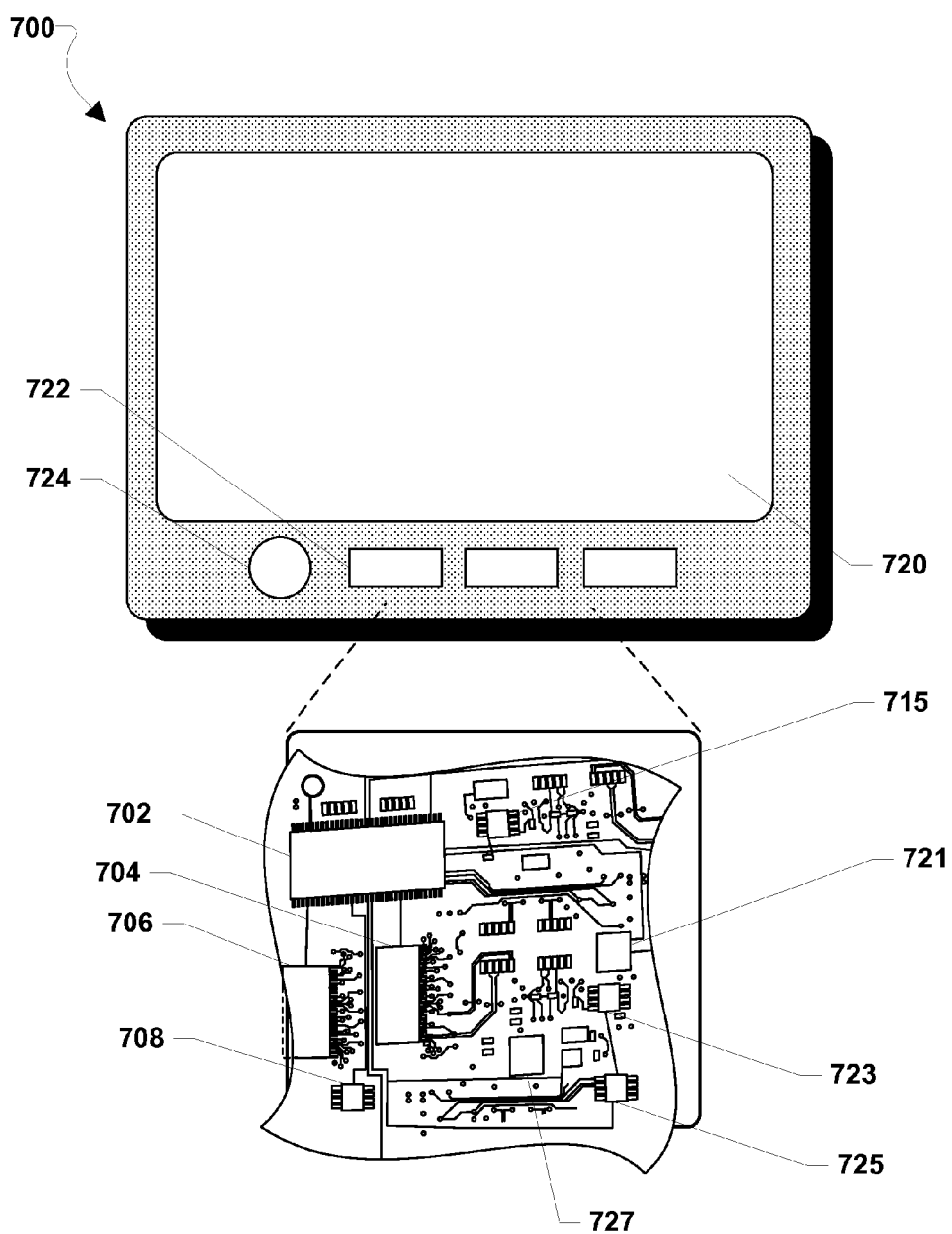
FIG. 7 is a component diagram of an example media system suitable for use with the various embodiments.

Various embodiments may be implemented within a variety of media systems, a media system 700 as illustrated in FIG. 7. In various embodiments, the media system 700 may be similar to the media system 102 illustrated in FIG. 1 and may implement any of the methods 200, 300, and 500 described above with reference to FIGS. 2, 3 and 5. The media system 700 may include a processor 702 coupled to an internal memory 704. Internal memory 704 may be volatile or non-volatile memory, and may also be secure and/or encrypted memories, or unsecure and/or unencrypted memory, or any combination thereof. The processor 702 may also be coupled to a touch screen display 720, such as a resistive-sensing touch screen, capacitive-sensing touch screen infrared sensing touch screen, or the like. Additionally, the media system 700 processor 702 may be connected to a wide-area network transceiver, which may be in the form of one or wireless modem chip(s) 727 configured to communicate with wireless networks (e.g., cellular data networks) via one or more antenna 708, 725 for sending and receiving electromagnetic radiation. The media system 700 may also include physical buttons 722 and 724 for receiving user inputs, which may include knobs, buttons, sliders, rockers, capacitive switches, and other physical devices for receiving user inputs. The media system 700 may also include an audio-visual system 715, which may be configured to drive one or more audio or video outputs, including speaker and display screens. The audiovisual system 715 may be coupled to a rendering system 721, which may include one or more CODECS and other software and instructions for rendering content and for controlling the one or more audio or video outputs. The media system 700 may have two or more short-range wireless transceivers 723 (e.g., Peanut, Bluetooth, Zigbee, Wi-Fi, RF radio) and antennae 725, for sending and receiving wireless communications, coupled to each other and/or to the processor 702. The transceivers 723 and antennae 725 may be used with the above-mentioned circuitry to implement the various wireless transmission protocol stacks and interfaces for establishing short-range communication links with other mobile devices.

Figure 8:
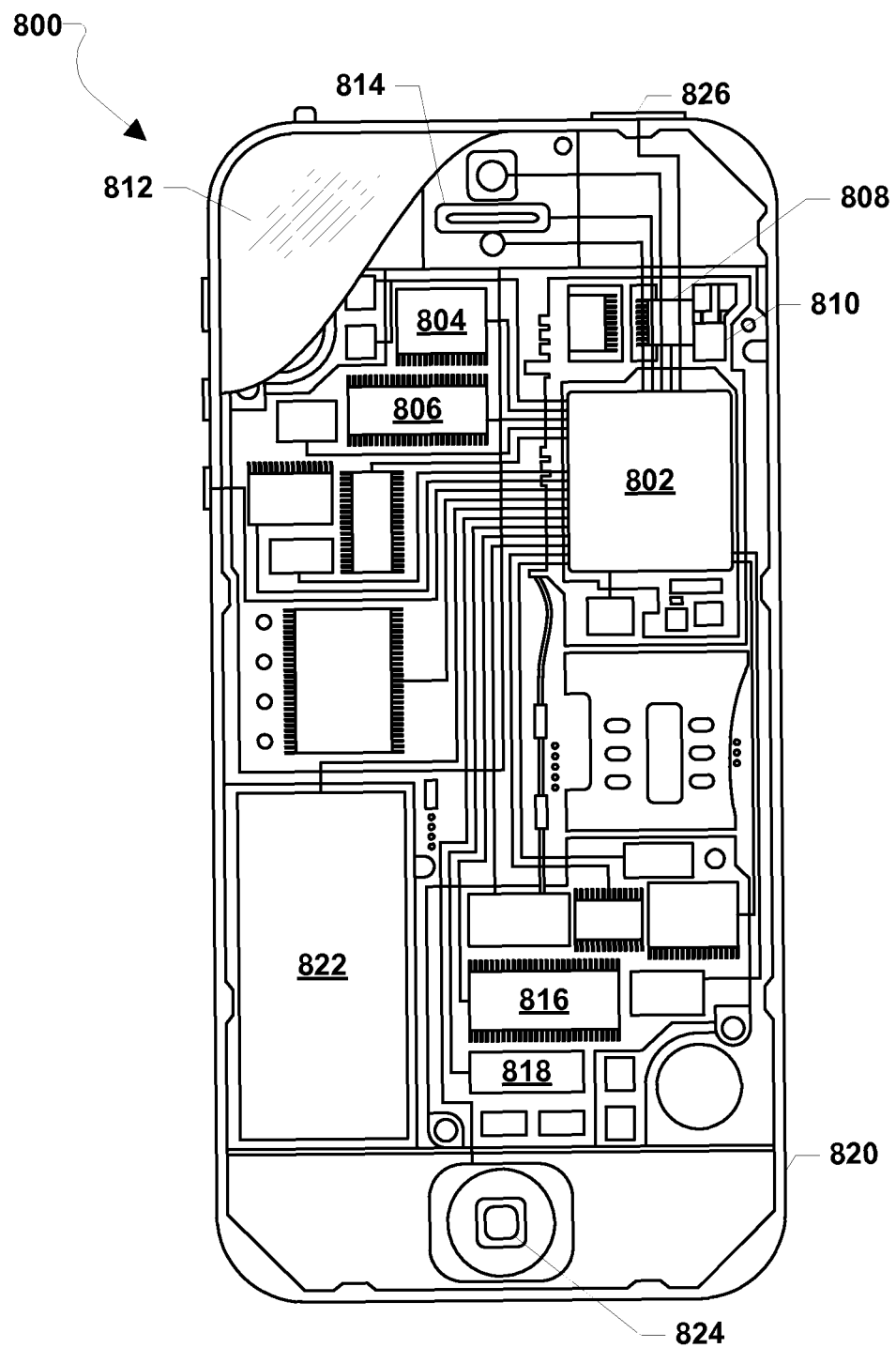
FIG. 8 is a component diagram of another example mobile device suitable for use with the various embodiments.

Various embodiments may also be implemented in any of a variety of mobile devices, an example of which is illustrated in FIG. 8. In various embodiments, the mobile device 800 may be similar to the mobile devices 104 and 106 as described with reference to FIG. 1 and may implement any of the methods 200, 300, and 500 described above with reference to FIGS. 2, 3 and 5. The mobile device 800 may include a processor 802 coupled to a touchscreen controller 804 and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the mobile device 800 need not have touch screen capability.

The mobile device 800 may have two or more short-range wireless transceivers 808 (e.g., Peanut, Bluetooth, Zigbee, Wi-Fi, RF radio) and antennae 810, for sending and receiving communications with other wireless devices via a short-range communication link. The two or more short-range wireless transceivers 808 may be coupled to each other and/or to the processor 802. The transceivers 808 and antennae 810 may be used with the above-mentioned circuitry to implement the various wireless transmission protocol stacks and interfaces. The mobile device 800 may include one or more wide-area network (e.g., cellular network) wireless transceivers or modem chip(s) 816 coupled to the processor and antennae 810 that enables communication via two or more cellular networks via two or more radio access technologies.

The mobile device 800 may include a peripheral device connection interface 818 coupled to the processor 802. The peripheral device connection interface 818 may be singularly configured to accept one type of connection, or may be configured to accept various types of physical and communication connections, common or proprietary, such as USB, FireWire, Thunderbolt, or PCIe. The peripheral device connection interface 818 may also be coupled to a similarly configured peripheral device connection port (not shown).

The mobile device 800 may also include speakers 814 for providing audio outputs. The mobile device 800 may also include a housing 820, constructed of a plastic, metal, or a combination of materials, for containing all or some of the components discussed herein. The mobile device 800 may include a power source 822 coupled to the processor 802, such as a disposable or rechargeable battery. The rechargeable battery may also be coupled to the peripheral device connection port to receive a charging current from a source external to the mobile device 800. The mobile device 800 may also include a physical button 824 for receiving user inputs. The mobile device 800 may also include a power button 826 for turning the mobile device 800 on and off.

The processors 702 and 802 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 704 and 806 before they are accessed and loaded into the processors 702 and 802. The processors 702 and 802 may include internal memory sufficient to store the application software instructions. In many devices the internal memory may be a volatile or nonvolatile memory, such as flash memory, or a mixture of both. For the purposes of this description, a general reference to memory refers to memory accessible by the processors 702 and 802 including internal memory or removable memory plugged into the device and memory within the processors 702 and 802 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory processor-readable storage medium. Tangible, non-transitory processor-readable storage media may be any available media that may be accessed by a processor. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory processor-readable media. Additionally, the operations of a method or algorithm may reside as one or any combination or set of codes and/or instructions on a tangible, non-transitory machine readable medium and/or processor-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for managing in-vehicle system network connectivity, comprising:
   determining an application requirement of a media application running on a first wireless device in communication with a first communication network over a first communication link;
   determining a first available bandwidth of the first communication link;
   receiving in the first wireless device from a second wireless device a second available bandwidth of a second communication link with a second communication network, wherein the second wireless device is in communication with the second communication network over the second communication link and in communication with the first wireless device over a third communication link;
   ranking an ability of the first wireless device and the second wireless device to meet the application requirement based on the first and second available bandwidths;
   selecting a highest ranked of the first wireless device and the second wireless device to receive content for presentation by the first wireless device over the respective first or second communication link; and
   receiving the content from the selected highest ranked of the first wireless device and the second wireless device.

2. The method of claim 1, wherein the application requirement comprises a quality of service (QoS) requirement including one or more of a minimum required data rate, a maximum permitted data delay, a minimum required throughput, a maximum permitted error rate, and a maximum permitted data loss rate.

3. The method of claim 1, further comprising:
   determining a radio access technology capability of each of the first and second wireless devices; and
   ranking the ability of the first wireless device and the second wireless device to meet the application requirement further based on the radio access technology capability of each of the first and second wireless devices.

4. The method of claim 1, further comprising:
   determining one or more carrier networks available to each of the first and second wireless devices; and
   ranking the ability of the first and second wireless devices to meet the application requirement further based on the carrier networks available to each of the first and second wireless devices.

5. The method of claim 1, further comprising:
   determining a battery level of the second wireless device; and
   ranking the ability of the first and second wireless devices to meet the application requirement further based on the battery level of the second wireless device.

6. The method of claim 1, further comprising:
   determining a received signal level of the first and second communication links; and
   ranking the ability of the first and second wireless devices to meet the application requirement further based on the received signal level of the first and second communication links.

7. The method of claim 1, further comprising:
   determining a connection reliability of each of the first and second communication links; and
   ranking the ability of the first and second wireless devices to meet the application requirement further based on the connection reliability of each of the first and second communication links.

8. The method of claim 1, further comprising:
   determining an application requirement of an application running on the second wireless device; and
   ranking the ability of the first and second wireless devices to meet the application requirement further based on the application requirement of the application running on the second wireless device.

9. The method of claim 1, further comprising:
   determining an anticipated disruption in one of more of the first communication link and the second communication link; and
   ranking the ability of the first and second wireless devices to meet the application requirement further based on any anticipated disruptions in the one of more of the first and second communication links.

10. The method of claim 1, further comprising ranking the ability of the second wireless device to meet the application requirement further based on an amount of time that the second wireless device has established a communication link with the first wireless device in the past.

11. The method of claim 1, further comprising:
    displaying a current ranking of the first and second wireless devices;
    receiving a user input regarding the ranking of the first and second wireless devices; and
    re-ranking the first and second wireless devices based in part on the received user input.

12. The method of claim 1, further comprising:
    receiving from a third wireless device a third available bandwidth of a fourth communication link with a third communication network, wherein the third wireless device is in communication with the third communication network over the fourth communication link and in communication with the first wireless device over a fifth communication link.

13. The method of claim 12, wherein:
    ranking an ability of the first wireless device and the second wireless device to meet the application requirement based on the first and second available bandwidths comprises ranking an ability of the first wireless device, the second wireless device, and the third wireless device to meet the application requirement based on the first, second, and third available bandwidths,
    selecting a highest ranked of the first wireless device and the second wireless device to receive content for presentation by the first wireless device over the respective first or second communication link comprises selecting a highest ranked of the first wireless device, the second wireless device, and the third wireless device to receive content for presentation by the first wireless device over the respective first, second, or fourth communication link, and
    receiving the content from the selected highest ranked of the first wireless device and the second wireless device comprises receiving the content from the selected highest ranked of the first wireless device, the second wireless device, and the third wireless device.

14. A first wireless device, comprising:
a first transceiver configured to communicate with a first communication network over a first communication link;
a second transceiver configured to communicate wirelessly with other wireless devices; and
a processor coupled to the first and second transceivers, and configured with processor-executable instructions to perform operations comprising:
determining an application requirement of a media application running on the first wireless device;
determining a first available bandwidth of the first communication link;
receiving from a second wireless device a second available bandwidth of a second communication link with a second communication network, wherein the second wireless device is in communication with the second communication network over the second communication link and in communication with the first wireless device over a third communication link;
ranking an ability of the first wireless device and the second wireless device to meet the application requirement based on the first and second available bandwidths;
selecting a highest ranked of the first wireless device and the second wireless device to receive content for presentation by the first wireless device over the respective first or second communication link; and
receiving the content from the selected highest ranked of the first wireless device and the second wireless device.

15. The first wireless device of claim 14, wherein the application requirement comprises a quality of service (QoS) requirement including one or more of a minimum required data rate, a maximum permitted data delay, a minimum required throughput, a maximum permitted error rate, and a maximum permitted data loss rate.

16. The first wireless device of claim 14, wherein the processor is configured with processor-executable instructions to perform operations further comprising:
determining a radio access technology capability of each of the first and second wireless devices; and
ranking the ability of the first wireless device and the second wireless device to meet the application requirement further based on the radio access technology capability of each of the first and second wireless devices.

17. The first wireless device of claim 14, wherein the processor is configured with processor-executable instructions to perform operations further comprising:
determining one or more carrier networks available to each of the first and second wireless devices; and
ranking the ability of the first and second wireless devices to meet the application requirement further based on the carrier networks available to each of the first and second wireless devices.

18. The first wireless device of claim 14, wherein the processor is configured with processor-executable instructions to perform operations further comprising:
determining a battery level of the second wireless device; and
ranking the ability of the first and second wireless devices to meet the application requirement further based on the battery level of the second wireless device.

19. The first wireless device of claim 14, wherein the processor is configured with processor-executable instructions to perform operations further comprising:
determining a received signal level of the first and second communication links; and
ranking the ability of the first and second wireless devices to meet the application requirement further based on the received signal level of the first and second communication links.

20. The first wireless device of claim 14, wherein the processor is configured with processor-executable instructions to perform operations further comprising:
determining a connection reliability of each of the first and second communication links; and
ranking the ability of the first and second wireless devices to meet the application requirement further based on the connection reliability of each of the first and second communication links.

21. The first wireless device of claim 14, wherein the processor is configured with processor-executable instructions to perform operations further comprising:
determining an application requirement of an application running on the second wireless device; and
ranking the ability of the first and second wireless devices to meet the application requirement further based on the application requirement of the application running on the second wireless device.

22. The first wireless device of claim 14, wherein the processor is configured with processor-executable instructions to perform operations further comprising:
determining an anticipated disruption in one of more of the first communication link and the second communication link; and
ranking the ability of the first and second wireless devices to meet the application requirement further based on any anticipated disruptions in the one of more of the first and second communication links.

23. The first wireless device of claim 14, wherein the processor is configured with processor-executable instructions to perform operations further comprising ranking the ability of the second wireless device to meet the application requirement further based on an amount of time that the second wireless device has established a communication link with the first wireless device in the past.

24. The first wireless device of claim 14, wherein the processor is configured with processor-executable instructions to perform operations further comprising:
displaying a current ranking of the first and second wireless devices;
receiving a user input regarding the ranking of the first and second wireless devices; and
re-ranking the first and second wireless devices based in part on the received user input.

25. The first wireless device of claim 12, wherein the first wireless device is an in-vehicle media system.

26. The first wireless device of claim 14, wherein the processor is configured with processor-executable instructions to perform operations further comprising:
receiving from a third wireless device a third available bandwidth of a fourth communication link with a third communication network, wherein the third wireless device is in communication with the third communication network over the fourth communication link and in communication with the first wireless device over a fifth communication link.

27. The first wireless device of claim 26, wherein the processor is configured with processor-executable instructions to perform operations such that:
- ranking an ability of the first wireless device and the second wireless device to meet the application requirement based on the first and second available bandwidths comprises ranking an ability of the first wireless device, the second wireless device, and the third wireless device to meet the application requirement based on the first, second, and third available bandwidths,
- selecting a highest ranked of the first wireless device and the second wireless device to receive content for presentation by the first wireless device over the respective first or second communication link comprises selecting a highest ranked of the first wireless device, the second wireless device, and the third wireless device to receive content for presentation by the first wireless device over the respective first, second, or fourth communication link, and
- receiving the content from the selected highest ranked of the first wireless device and the second wireless device comprises receiving the content from the selected highest ranked of the first wireless device, the second wireless device, and the third wireless device.

28. A first wireless device, comprising:
- means for communicating with a first communication network over a first communication link;
- means for communicating via short-range communication links with other wireless devices;
- means for determining an application requirement of a media application running on the first wireless device;
- means for determining a first available bandwidth of the first communication link;
- means for receiving from a second wireless device a second available bandwidth of a second communication link with a second communication network, wherein the second wireless device is in communication with the second communication network over the second communication link and in communication with the first wireless device over a third communication link;
- means for ranking an ability of the first wireless device and the second wireless device to meet the application requirement based on the first and second available bandwidths;
- means for selecting a highest ranked of the first wireless device and the second wireless device to receive content for presentation by the first wireless device over the respective first and second communication link; and
- means for receiving the content from the selected highest ranked of the first wireless device and the second wireless device.

29. The first wireless device of claim 28, further comprising:
- means for receiving from a third wireless device a third available bandwidth of a fourth communication link with a third communication network, wherein the third wireless device is in communication with the third communication network over the fourth communication link and in communication with the first wireless device over a fifth communication link.

30. The first wireless device of claim 29, wherein:
- means for ranking an ability of the first wireless device and the second wireless device to meet the application requirement based on the first and second available bandwidths comprises means for ranking an ability of the first wireless device, the second wireless device, and the third wireless device to meet the application requirement based on the first, second, and third available bandwidths,
- means for selecting a highest ranked of the first wireless device and the second wireless device to receive content for presentation by the first wireless device over the respective first or second communication link comprises means for selecting a highest ranked of the first wireless device, the second wireless device, and the third wireless device to receive content for presentation by the first wireless device over the respective first, second, or fourth communication link, and
- means for receiving the content from the selected highest ranked of the first wireless device and the second wireless device comprises means for receiving the content from the selected highest ranked of the first wireless device, the second wireless device, and the third wireless device.

31. A non-transitory processor-readable storage medium having stored thereon processor-executable instructions configured to cause a processor of a first wireless device to perform operations comprising:
- determining an application requirement of a media application running on the first wireless device comprising a quality of service (QoS) requirement including one or more of a minimum required data rate, a maximum permitted data delay, a minimum required throughput, a maximum permitted error rate, and a maximum permitted data loss rate;
- determining a first available bandwidth of a first communication link with a first network over a first communication link;
- receiving from a second wireless device a second available bandwidth of a second communication link with a second communication network, wherein the second wireless device is in communication with the second communication network over the second communication link and in communication with the first wireless device over a third communication link;
- ranking an ability of the first wireless device and the second wireless device to meet the application requirement based on the first and second available bandwidths;
- selecting a highest ranked of the first wireless device and the second wireless device to receive content for presentation by the first wireless device over the respective first or second communication link; and
- receiving the content from the selected highest ranked of the first wireless device and the second wireless device.

32. The non-transitory processor-readable storage medium of claim 31, wherein the stored processor-executable instructions are configured to cause a processor of the first wireless device to perform operations further comprising:
- determining a radio access technology capability of each of the first and second wireless devices; and
- ranking the ability of the first wireless device and the second wireless device to meet the application requirement further based on the radio access technology capability of each of the first and second wireless devices.

33. The non-transitory processor-readable storage medium of claim 31, wherein the stored processor-executable instructions are configured to cause a processor of the first wireless device to perform operations further comprising:
- determining one or more carrier networks available to each of the first and second wireless devices; and ranking the ability of the first and second wireless devices to meet the application requirement further based on the carrier networks available to each of the first and second wireless devices.

34. The non-transitory processor-readable storage medium of claim 31, wherein the stored processor-executable instructions are configured to cause a processor of the first wireless device to perform operations further comprising:
determining a battery level of the second wireless device; and
ranking the ability of the first and second wireless devices to meet the application requirement further based on the battery level of the second wireless device.

35. The non-transitory processor-readable storage medium of claim 31, wherein the stored processor-executable instructions are configured to cause a processor of the first wireless device to perform operations further comprising:
determining a received signal level of the first and second communication links; and
ranking the ability of the first and second wireless devices to meet the application requirement further based on the received signal level of the first and second communication links.

36. The non-transitory processor-readable storage medium of claim 31, wherein the stored processor-executable instructions are configured to cause a processor of the first wireless device to perform operations further comprising:
determining a connection reliability of each of the first and second communication links; and
ranking the ability of the first and second wireless devices to meet the application requirement further based on the connection reliability of each of the first and second communication links.

37. The non-transitory processor-readable storage medium of claim 31, wherein the stored processor-executable instructions are configured to cause a processor of the first wireless device to perform operations further comprising:
receiving from a third wireless device a third available bandwidth of a fourth communication link with a third communication network, wherein the third wireless device is in communication with the third communication network over the fourth communication link and in communication with the first wireless device over a fifth communication link.

38. The non-transitory processor-readable storage medium of claim 37, wherein the stored processor-executable instructions are configured to cause a processor of the first wireless device to perform operations such that:
ranking an ability of the first wireless device and the second wireless device to meet the application requirement based on the first and second available bandwidths comprises ranking an ability of the first wireless device, the second wireless device, and the third wireless device to meet the application requirement based on the first, second, and third available bandwidths,
selecting a highest ranked of the first wireless device and the second wireless device to receive content for presentation by the first wireless device over the respective first or second communication link comprises selecting a highest ranked of the first wireless device, the second wireless device, and the third wireless device to receive content for presentation by the first wireless device over the respective first, second, or fourth communication link, and
receiving the content from the selected highest ranked of the first wireless device and the second wireless device comprises receiving the content from the selected highest ranked of the first wireless device, the second wireless device, and the third wireless device.

\* \* \* \* \*